Dec. 26, 1950  F. E. WOLFE  2,535,525
GATE VALVE

Filed Aug. 23, 1948  2 Sheets-Sheet 1

F. E. Wolfe
INVENTOR
BY Snow & Co.
ATTORNEYS.

Dec. 26, 1950 — F. E. WOLFE — 2,535,525
GATE VALVE
Filed Aug. 23, 1948 — 2 Sheets-Sheet 2

F. E. Wolfe
INVENTOR
BY C. A. Snow & Co.
ATTORNEYS.

Patented Dec. 26, 1950

2,535,525

UNITED STATES PATENT OFFICE 2,535,525

GATE VALVE

Fred E. Wolfe, Morgantown, W. Va.

Application August 23, 1948, Serial No. 45,655

1 Claim. (Cl. 251—17)

This invention relates to improvements in valves.

An object of the invention is to provide an improved gate valve construction in which the gate linkage thus insures an absolutely tight closure of the gate, the gate being supported by interconnected linkage and directly connected with and operated by a threaded valve stem mounted through the bonnet portion of the valve casing.

Another object of the invention is to provide an improved gate valve including a valve casing and detachable bonnet therefor, together with a replaceable threaded gate seat and cooperating gate supported by interconnected linkage, being directly connected with and operated by a threaded valve stem connected through a stem actuating threaded bushing forming a portion of a bonnet which will be detachably mounted upon the valve casing.

A further object of the invention is to provide an improved form and construction of gate valve which will be highly efficient in operation and relatively inexpensive to manufacture and produce.

Other objects will appear as the description proceeds.

In the accompanying drawings which form a part of this application:

Like characters of reference are used throughout the following specification and the accompanying drawings to designate corresponding parts.

Figure 1:
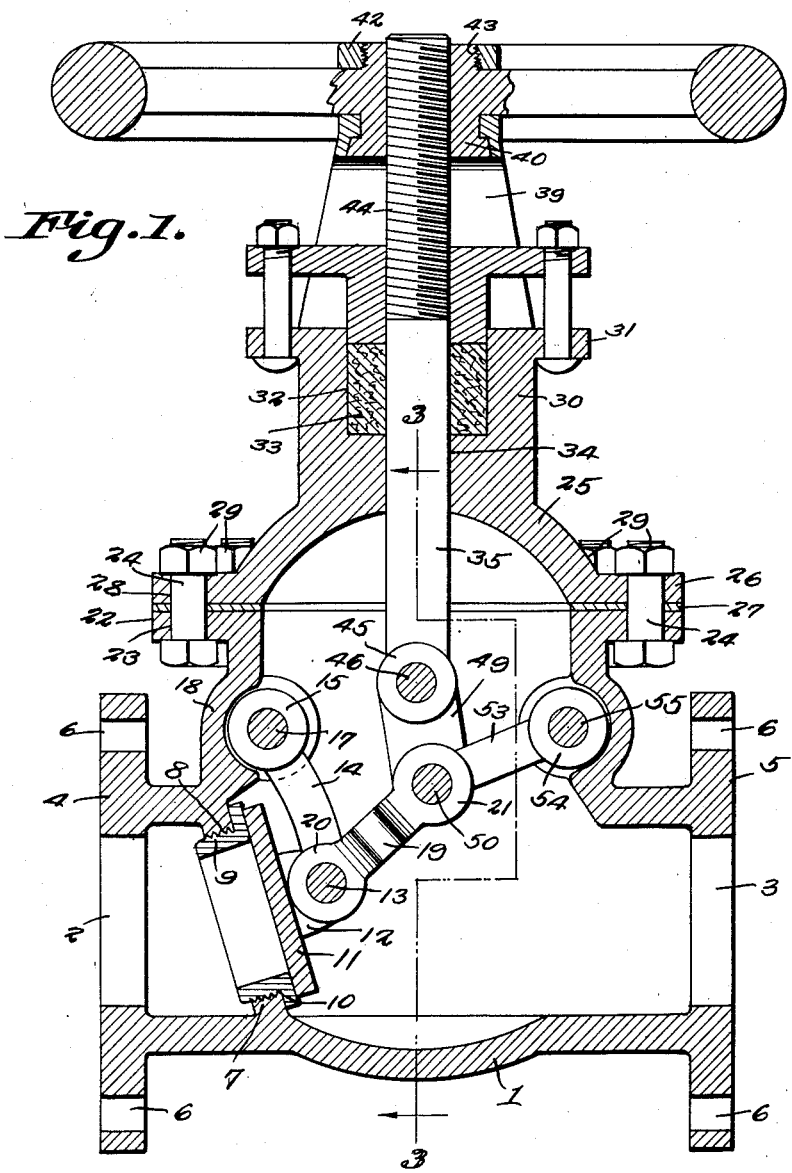
Figure 1 is a vertical sectional view through the improved gate valve showing the gate in closed position upon the gate seat.
Figure 2:
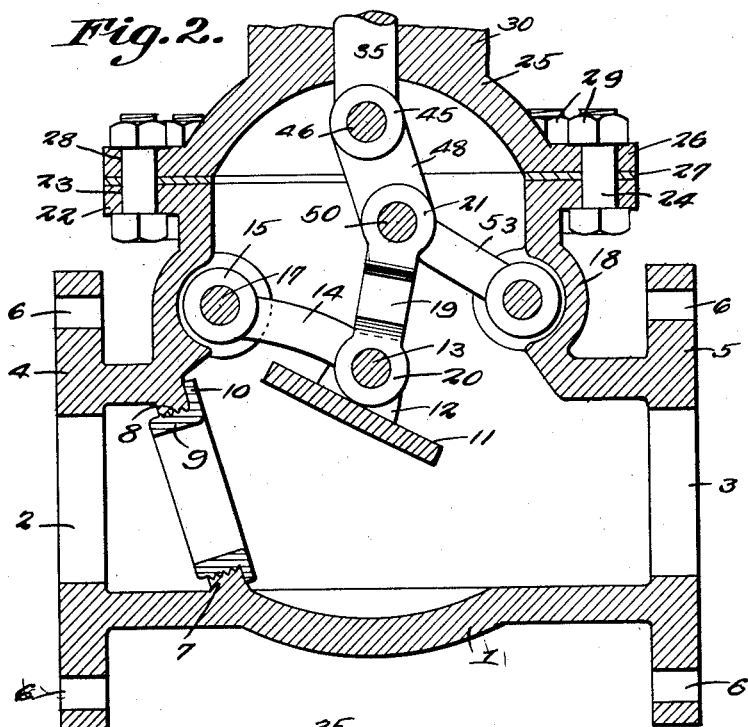
Fig. 2 is a vertical sectional view through the improved gate valve showing the gate in open position.
Figure 3:
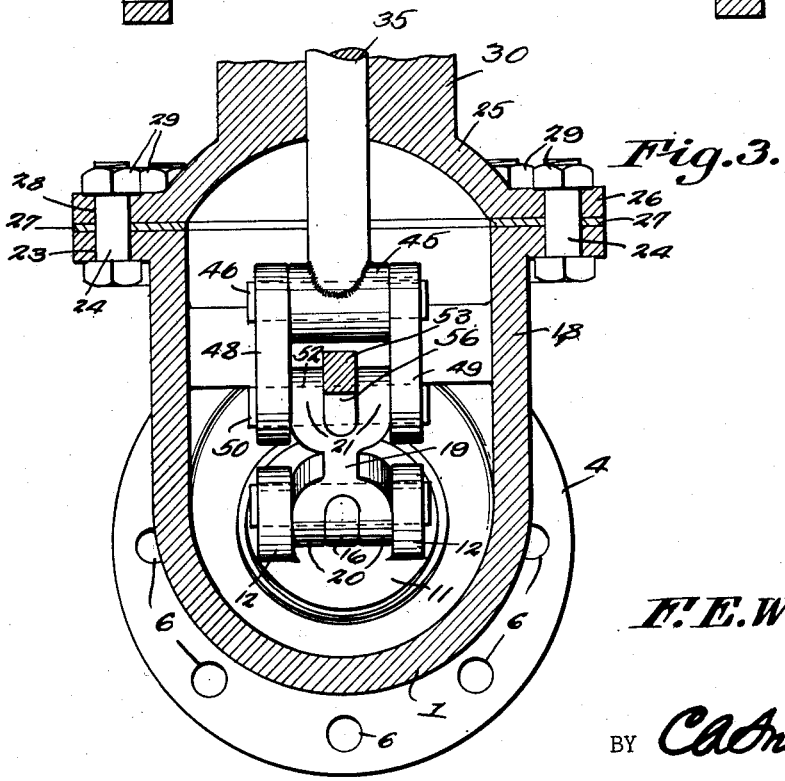
Fig. 3 is a sectional view taken on the line 3—3 of Fig. 1.

In carrying out the invention, there is shown and provided an improved form and construction of gate valve including a valve casing 1 having oppositely disposed inlet and outlet ports 2 and 3, and annular attaching flanges 4 and 5 disposed about said ports, the same being provided with spaced circumferentially disposed openings 6 for receiving coupling bolts (not shown).

A web 7 is formed within the valve casing 1 adjacent its inlet end and is formed with a threaded bore 8 in which an externally threaded gate seat 9 will be received. The gate seat 9 is also formed with an annular flange 10 upon which a disc-shaped gate 11 will rest when the valve is in closed position.

A pair of spaced ears 12 are formed upon the inner surface of the gate 11 and are apertured to receive the pivot pin 13. A single link 14 having apertured eyes 15 and 16 in its opposite ends is supported upon the upper pivot pin 17 mounted transversely of the upper portion 18 of the valve casing 1, while the lower eye 16 of the link is disposed about the central portion of the pivot pin 13.

A gate actuating link 19 is formed with oppositely extending spaced apertured ears 20 and 21, and the apertured ears 20 are adapted to be mounted upon the pivot pin 13 at the opposite sides of the lower eye 16 of the link 14 and between said eye 16 and the spaced ears 12 of the gate 11.

An annular flange 22 is formed about the upper portion 18 of the casing 1, and is provided with circumferentially arranged openings 23 through which the bolts 24 are adapted to extend.

A bonnet 25 having an annular flange 26 is adapted to seat on a gasket 27 disposed upon the annular flange 22, with the bolts 24 extending through openings 28 formed through said flange 26, said assembly being held tightly together by means of the bolts 24 and the nuts 29 threaded thereon.

The upper end 30 of the bonnet 25 is cylindrical in shape and formed with a laterally extending annular flange 31 about its upper end. The upper portion of the upper end 30 of the bonnet 25 is vertically bored at 32 to receive the valve stem packing 33, and a reduced bore 34 is formed below and axially of the bore 32 of a size to receive the vertically disposed valve actuating stem 35. A flanged gland 36 is disposed in the bore 32 in contact with the packing 33, and is secured in place by the plurality of bolts 37 and nuts 38, said bolts 37 extending through the flange 31 and the flange on the gland 36.

Spaced vertical arms 39 are formed integrally with the upper portion end 30 of the bonnet 25, and support the threaded nut 40 upon their upper ends, said nut 40 being freely rotatable and forming the hub of the valve actuating hand wheel 41. A threaded lock nut 42 is secured upon the threaded upper end 43 of the valve stem actuating nut 40 for securing the parts in assembled position.

The upper end of the valve actuating stem 35 is threaded at 44 for reception within the internally threaded nut 40, while the lower end of the stem 35 is formed with a transverse collar 45, through which the pin 46 extends. Spaced links 48 and 49 are supported at their upper ends upon the ends of the pin 46, while their lower ends are supported upon the opposite ends of the connecting pin 50 which extends through the upper ears 21 of the gate actuating link 19.

A single link 53 is pivotally supported at one end 54 upon the pin 55 mounted transversely of the upper portion 18 of the valve casing 1, diametrically opposite to the pivot pin 17, and the opposite end 56 is supported centrally upon the connecting pin 50.

From the foregoing description, it will be seen that when the hand wheel 41 is rotated in one direction, the valve stem 35 will move upwardly and through the various links associated therewith, will cause the gate 11 to unseat from the annular flange 10 of the gate seat 9. Conversely, when the hand wheel 41 is rotated in the opposite direction, the valve stem 35 will move downwardly causing the associated links to force the gate 11 upon the annular flange 10 of the gate seat 9, thereby cutting off the flow through the valve casing 1.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

A valve of the character described, comprising a valve casing including a bonnet, said casing having horizontal aligned inlet and outlet ports, a valve seat formed within the casing spaced from the inlet port, a valve stem operating vertically through the valve bonnet and extending into the valve casing, spaced links pivotally connected to the end of the valve stem within the casing, on opposite sides of the valve stem, a single link pivotally connected with the valve casing above the outlet port, a gate actuating link, a connecting pin pivotally connecting the single link and gate actuating link between said spaced links, a gate valve, to which the gate actuating link is pivotally connected, a single link pivotally connected with the wall of the casing directly over the inlet port, and a pivot pin connecting the latter link with said gate valve and the gate actuating link, whereby vertical movement of the valve stem swings the gate valve to a position centrally of the valve casing substantially above the path of travel of water flowing through the valve casing.

FRED E. WOLFE.

REFERENCES CITED

The following references are of record in the file of this patent:

UNITED STATES PATENTS

| Number | Name | Date |
|---|---|---|
| 430,301 | Schenck | June 17, 1890 |
| 971,802 | Tanner | Oct. 4, 1910 |
| 2,373,001 | Allen | Apr. 3, 1945 |
| 2,394,471 | Paul | Feb. 5, 1946 |